Patented Mar. 8, 1932

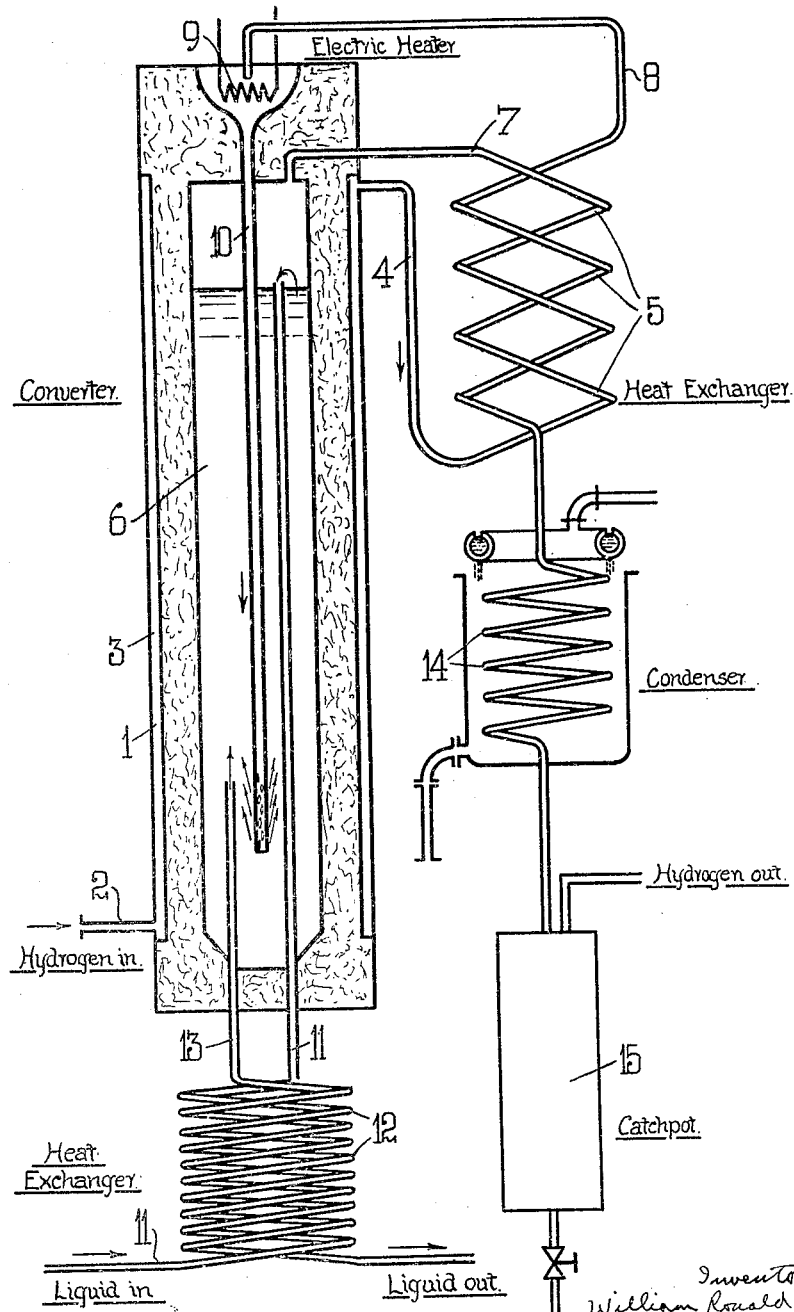

1,848,505

UNITED STATES PATENT OFFICE

WILLIAM RONALD TATE AND HAROLD PARK STEPHENSON, OF NORTON-ON-TEES, ENGLAND, ASSIGNORS TO IMPERIAL CHEMICAL INDUSTRIES LIMITED, OF LONDON, ENGLAND, A BRITISH COMPANY

HEATING HYDROGEN FOR USE IN DESTRUCTIVE HYDROGENATION

Application filed February 19, 1930, Serial No. 429,737, and in Great Britain February 21, 1929.

The present invention relates to heating the hydrogen for use in destructive hydrogenation processes.

According to the present invention the hydrogen is passed through a cooling jacket on the inside of the wall of the hydrogenation converter, to a heat interchanger utilizing the sensible heat of the vaporous reaction products and then over an electric heater preferably inside the converter.

The temperature may rise to 100° C. inside the jacket, from 100° C. to say 300° C. in the heat exchanger, and from 300° C. to about 500° C. with the aid of the electric heater.

The invention is illustrated in the accompanying drawing.

Here 1 is the high pressure wall of the hydrogenation converter. Hydrogen is admitted at 2 and proceeds up the space 3 between the wall of the converter and the lining, which may be of asbestos or asbestos and cement. The hydrogen leaves the converter at 4 and proceeds to the heat interchanger 5. Here it undergoes heat exchange with the vaporous products of reaction escaping from the reaction vessel 6 by the pipe 7. Thence it makes its way by the pipe 8 to the electric heater 9, situated in the head of the converter 1. The hydrogen enters the reaction vessel through the downwardly projecting pipe 10.

Preheated coal paste or oil to be hydrogenated is introduced into the vessel through the pipe 11 and undergoes heat exchange with the outgoing liquid reaction products in the interchanger 12.

The liquid reaction products leave the vessel by pipe 13.

After heat exchange with the hydrogen the vaporous reaction products are cooled and condensed in the water cooler 14 and proceed to the high pressure catch-pot 15.

The heat interchangers 5 and 12 may also be situated within the high pressure converter.

The pressure employed in the reaction is above 50 atmospheres and preferably about 250 atmospheres, the proportion of hydrogen to oil or coal paste employed is of the order of 1000 cubic metres of hydrogen (measured at normal temperatures and pressures) per ton of oil. In the appended claims by "carbonaceous liquid" we mean oil or a suspension of coal in oil.

We declare that what we claim is:—

1. In the destructive hydrogenation of carbonaceous liquids, passing hydrogen under high pressure in contact with the walls of a reaction vessel to heat said hydrogen and cool said walls, then passing said hydrogen to external heat exchange with the vaporous products of said hydrogenation, and finally passing it into the reaction space.

2. In the destructive hydrogenation of carbonaceous liquids, passing hydrogen under high pressure in contact with the walls of a reaction vessel to heat said hydrogen and cool said walls, then passing said hydrogen to external heat exchange with the vaporous products of said hydrogenation, heating it electrically and finally passing it into the reaction space.

3. Apparatus for the destructive hydrogenation of carbonaceous liquids comprising a high pressure vessel, an internal cooling jacket adapted to cool the pressure resisting walls and heat incoming hydrogen, a reaction vessel inside and spaced from said jacket, an electric heater adapted to heat said incoming hydrogen, situated in said high pressure vessel, and an external heat interchanger adapted to transfer heat from outgoing vaporous products to said incoming hydrogen.

4. An apparatus for the destructive hydrogenation of carbonaceous liquids comprising a vertical high pressure vessel, an internal cooling jacket adapted to cool the pressure resisting walls and heat incoming hydrogen, a long vertical reaction vessel inside and spaced from said jacket, an electric heater adapted to heat said incoming hydrogen, situated in said high pressure vessel, and an external heat interchanger adapted to transfer heat from outgoing vaporous products to said incoming hydrogen.

5. Apparatus for the destructive hydrogenation of carbonaceous liquids comprising a high pressure vessel, an internal cooling jacket adapted to cool the pressure resisting walls and heat incoming hydrogen, a reaction vessel inside and spaced from said jacket, an electric heater adapted to heat said incoming hydrogen, situated in said high pressure vessel, and external heat interchangers adapted to transfer heat from outgoing vaporous and liquid products to incoming hydrogen and liquid reactants respectively.

6. An apparatus as set forth in claim 5 in which the heat interchangers are in the form of coils.

In witness whereof, we have hereunto signed our names this 3rd day of February, 1930.

WILLIAM RONALD TATE.
HAROLD PARK STEPHENSON.